(12) United States Patent
Watters

(10) Patent No.: US 6,323,996 B1
(45) Date of Patent: *Nov. 27, 2001

(54) REFLECTOR TELESCOPE WITH AN ADJUSTABLE SECONDARY MIRROR ASSEMBLY

(76) Inventor: George M. Watters, 17888 S. Watson Rd., Coeur d'Alene, ID (US) 83814

( * ) Notice: Subject to any disclaimer, the term of this patent is extended or adjusted under 35 U.S.C. 154(b) by 0 days.

This patent is subject to a terminal disclaimer.

(21) Appl. No.: 09/567,172

(22) Filed: May 8, 2000

Related U.S. Application Data

(63) Continuation-in-part of application No. 09/090,129, filed on Jun. 3, 1998, now Pat. No. 6,061,175.

(51) Int. Cl.$^7$ .............................. G02B 23/00; G02B 17/00
(52) U.S. Cl. ........................ 359/399; 359/366; 359/857
(58) Field of Search ..................................... 359/364–367, 359/399, 405–409, 480–482, 856–858, 871, 694, 698, 725–731

(56) References Cited

U.S. PATENT DOCUMENTS

| | | | |
|---|---|---|---|
| 2,504,384 | * | 4/1950 | Bouwers ............................. 359/364 |
| 5,150,260 | * | 9/1992 | Chigira ............................... 359/694 |
| 5,416,632 | * | 5/1995 | Carlisle ............................... 359/399 |
| 5,489,142 | * | 2/1996 | Mathieu ............................. 359/430 |
| 5,515,210 | * | 5/1996 | Devenyi ............................. 359/694 |
| 6,061,175 | * | 5/2000 | Watters ............................... 359/366 |

* cited by examiner

Primary Examiner—Thong Nguyen
(74) Attorney, Agent, or Firm—Black Lowe & Graham

(57) ABSTRACT

A reflector telescope (10) includes at least one moveable secondary mirror assembly, thereby allowing control over the distance between the primary and secondary mirrors. A preferred telescope tube assembly includes a plurality of frame elements, between which is defined an optical path. An inner end of the telescope tube assembly supports a primary mirror assembly (200). In a preferred version of the reflector telescope, an inner secondary mirror assembly (300) and an outer secondary mirror assembly (400) are carried by the telescope tube assembly. Each secondary mirror assembly includes a secondary mirror and optical equipment such as an eyepiece. The secondary mirror assemblies are slid along the frame elements of the telescope tube assembly, allowing the distance between the primary and secondary mirrors to be controlled. Controlling the distance between the primary and secondary mirrors allows the use of any given focuser and eyepiece assembly to be used in the secondary mirror assembly; allows the focuser tube of each secondary mirror assembly to be kept substantially out of the telescope tube assembly, while still allowing the eyepiece associated with the secondary mirror assembly to be focused; and results in sharp focus over a substantially greater range of distance than conventional reflector telescopes, and in particular allows focus on extremely close objects.

6 Claims, 7 Drawing Sheets

REFLECTOR TELESCOPE WITH AN ADJUSTABLE SECONDARY MIRROR ASSEMBLY

CROSS-REFERENCES

This application is a continuation in part of United States patent application 09/090,129, filed Jun. 3, 1998, which will issue as U.S. Pat. No. 6,061,175 on May 9, 2000.

BACKGROUND

In a typical prior art application, a Newtonian reflector telescope includes a tube having an open outer end and a closed inner end. A concave primary mirror is carried against or near the closed inner end, and reflects a cone-shaped light pattern back toward the open end. A secondary mirror is supported within the tube near the open end, and is oriented at a 45 degree angle. The secondary mirror reflects the light generally perpendicular to the tube, and into an eyepiece carried on the outside of the tube. A typical eyepiece has a rack-and-pinion adjustment, and resembles a microscope.

The primary mirror has a focal length, i.e. a length between the primary mirror and the point or plane of focus, e.g. at the eyepiece. The focal ratio is the focal length divided by the diameter of the primary mirror.

A number of problems are associated with such reflector telescopes. A first problem is of a commercial nature, in that the tube and primary mirror of a first manufacturer are often incompatible with the focuser and eyepiece of a second manufacturer. Given a tube and primary mirror having a particular focal length and focal ratio, an eyepiece and associated focusing device (or camera or similar optical device) must be selected which is adapted for bringing into focus a fixed range of distances; e.g. 1000' to infinity. It is a characteristic of the market place that where the tube and primary mirror is made by a given manufacturer, the recommended eyepiece and associated focusing device will be so adapted. However, where a second manufacturer's devices (eyepiece, camera, etc.) are used with the tube and primary mirror of a first manufacturer, it is often the case that the device is unusable, due to incompatibility with focal characteristics of the primary mirror. As a result, it is often the case that a tube and primary mirror made by a first manufacturer must be fitted with a focuser and eyepiece made by that manufacturer. In this manner, many manufacturers tend to prevent the use of other manufacturers' equipment with their equipment.

A second problem results from the use of reflector telescopes. Depending on the focusing conditions, a focuser tube may extend from the eyepiece into the main tube of the telescope to an excessive degree. This results in occlusion of the view, in that some light entering the main tube is prevented from contacting the primary mirror because it is blocked by the focusing tube. With known reflector telescopes, this condition will result when the eyepiece is focused to one extreme.

A third problem results from the use of reflector telescopes. Since most reflector telescopes are designed for astronomical use, they are only able to focus at the most distant terrestrial objects. The reason for this inadequacy is that, given the focal length, the eyepiece and associated focuser are constructed for focusing at astronomically distant objects. Nevertheless, reflector telescopes are not inherently unable to be used for viewing extremely close objects. However, in the prior art, no successful strategy for focusing a single telescope from as little as 10 feet to infinite distance has been developed.

For the foregoing reasons, there is a need for a reflector telescope that will allow operation of any given telescope tube assembly and primary mirror with any given focuser and eyepiece assembly. The reflector telescope must operate with the focuser tube substantially out of the main telescope tube, while still allowing the eyepiece to be focused. Additionally, the reflector telescope should be adapted for sharp focus over a substantially greater range of distance than conventional reflector telescopes, and in particular should be adapted for focus on extremely close objects.

SUMMARY

The present invention is directed to an apparatus that satisfies the above needs. A reflector telescope with an adjustable secondary mirror assembly can be adjusted to allow operation of any given telescope tube assembly and primary mirror with any given focuser and eyepiece assembly used in the secondary mirror assembly. The distance between the at least one secondary mirror assemblies and the primary mirror assembly is adjustable, thereby allowing the focuser tube of each secondary mirror assembly to be kept substantially out of the telescope tube assembly, while still allowing the eyepiece associated with the secondary mirror assembly to be focused. Additionally, movement of the secondary mirror assemblies of the instant reflector telescope results in sharp focus over a substantially greater range of distance than conventional reflector telescopes, and in particular allows focus on extremely close objects.

The reflector telescope with an adjustable secondary mirror assembly of the present invention provides some or all of the following structures.

(A) A telescope tube assembly includes a plurality of frame tube or rod elements defining a passage between them.

(B) A primary mirror assembly, carried at an inner end of the telescope tube assembly, includes a primary mirror carried within a cylindrical tube enclosure. In a preferred embodiment, the primary mirror defines first and second reflective surfaces. A primary mirror mover permits movement of the primary mirror between a first position wherein the first reflective surface is moved into an optical path defined within the telescope tube assembly to a second position wherein the second reflective surface is moved into the optical path defined within the telescope tube assembly.

(C) A first, or inner, secondary mirror assembly includes a cylindrical tube enclosure having an outside surface carrying a plurality of cylindrical bearings, each cylindrical bearing sliding on an associated frame tube element of the telescope tube assembly. A secondary mirror is carried within the cylindrical passage of the telescope tube assembly by a secondary mirror support carried by a cylindrical tube enclosure. The cylindrical bearings allow the first secondary mirror assembly to be moved along the telescope tube assembly in a manner that allows selection of the distance between the primary mirror and the first secondary mirror.

(D) Optionally, a second, or outer, secondary mirror assembly includes substantially the same elements as the first secondary mirror assembly, and slides on the plurality of frame tube or rod elements of the telescope tube assembly between the first secondary mirror assembly and an outer end of the telescope tube assembly.

It is therefore a primary advantage of the present invention to provide a novel reflector telescope having adjustment means for varying the distance between the secondary mirror and the primary mirror, thereby allowing the use of a variety of different pieces of optical equipment associated with the secondary mirror, by adjusting the distance between the primary and secondary mirror to suit the piece of optical equipment selected.

Another advantage of the present invention is to provide a novel reflector telescope having adjustment means for varying the distance between the secondary mirror and the primary mirror, thereby allowing the secondary mirror and associated optical equipment (e.g. the eyepiece) to be adjusted to a location (typically closer to the outer end of the telescope frame assembly) that is not the standard location for astronomical viewing with the optical equipment, but which allows sharp focus on objects much closer to the telescope that would otherwise be possible.

Another advantage of the present invention is to provide a novel reflector telescope having adjustment means for varying the distance between the secondary mirror and the primary mirror in a manner which cooperates synergistically with a primary mirror having more than one reflective surface, particularly where each reflective surface has a different focal length.

A still further advantage of the present invention is to provide a novel reflector telescope having adjustment means for varying the distance between the secondary mirror and the primary mirror, thereby allowing the secondary mirror and associated optical equipment to be moved a precise distance from the primary mirror which results in both the sharp focus on the object to be viewed and also results in reduction of the degree of occlusion of the optical path by the focuser tube.

Other objectives, advantages and novel features of the invention will become apparent to those skilled in the art upon examination of the specification and the accompanying drawings.

DRAWINGS

These and other features, aspects, and advantages of the present invention will become better understood with regard to the following description, appended claims, and accompanying drawings where:

FIG. 1, PRIOR ART, is a perspective view of the outer end of a prior art reflector telescope, illustrating the secondary mirror and the degree to which the focuser tube of the eyepiece is required to move into the optical path defined within the telescope tube.

Figure 9:
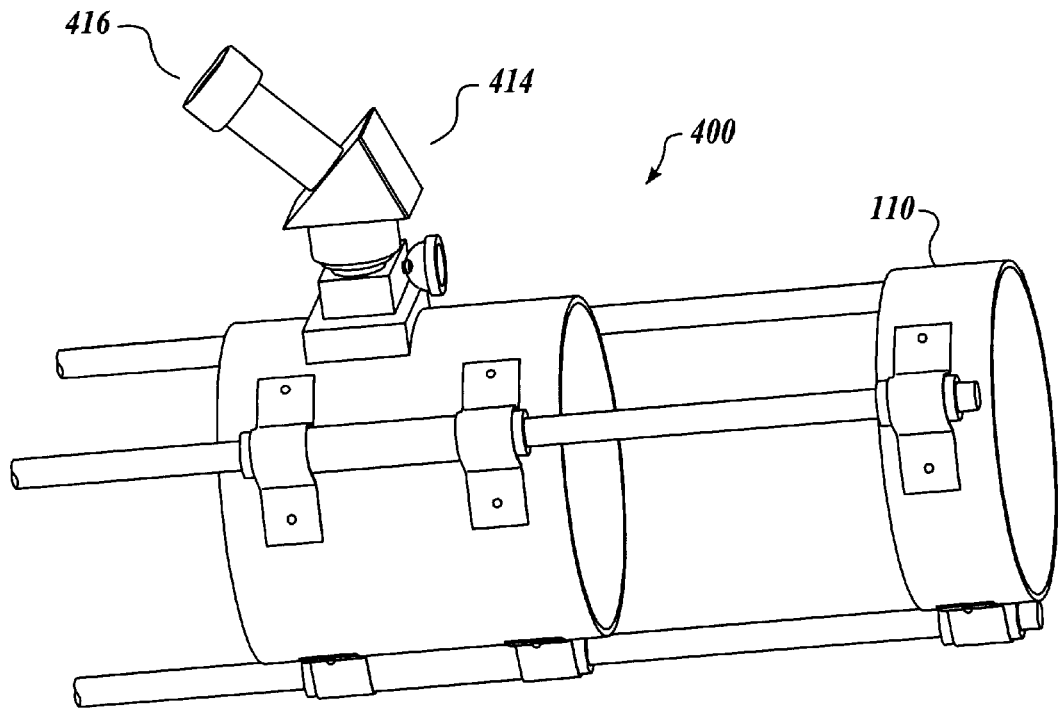

FIG. 9 is a perspective view of the outer secondary mirror assembly outfitted with a first focuser, illustrating particularly that the outer secondary mirror assembly must be positioned approximately 6" from the outer end of the telescope tube assembly, taking into account the distance of the object to be viewed, the need to minimize occlusion of the optical path by the focuser tube and the specific nature of the first focuser and attached optics.

Figure 10:
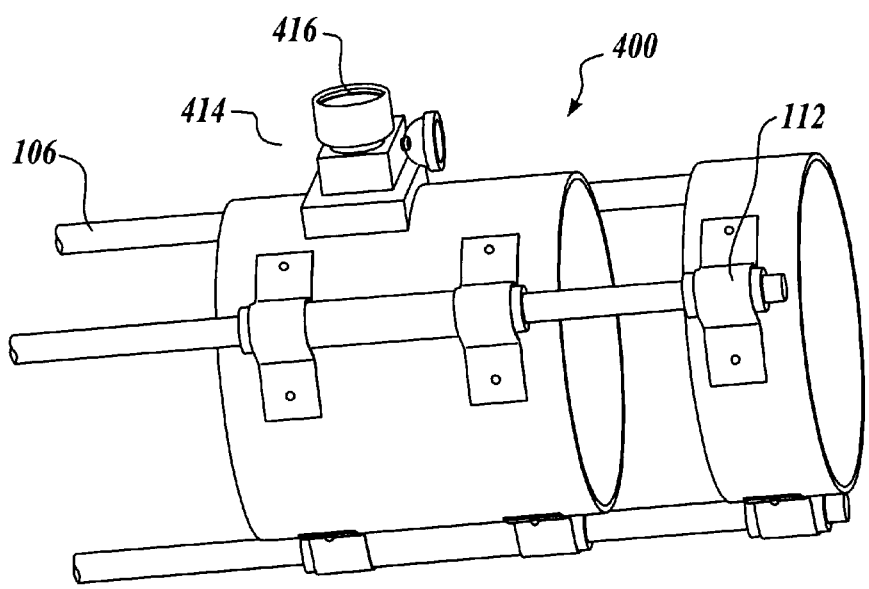

FIG. 10 is a view similar to that of FIG. 9, illustrating that under similar conditions, a focuser with different attached optics should be positioned approximately 3" from the outer end of the telescope tube assembly, although the object to be viewed is the same.

Figure 1:
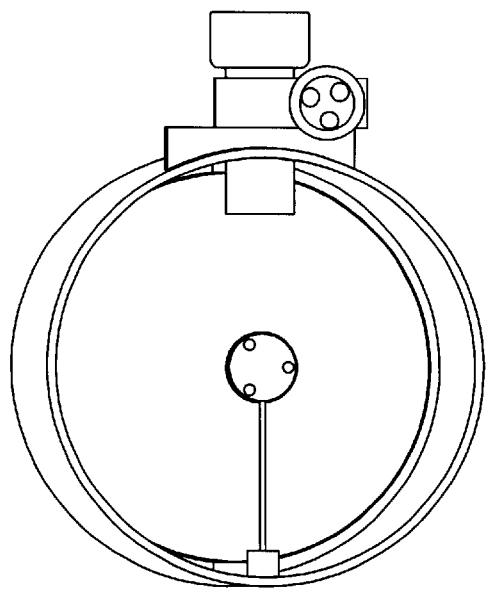
Figure 2:
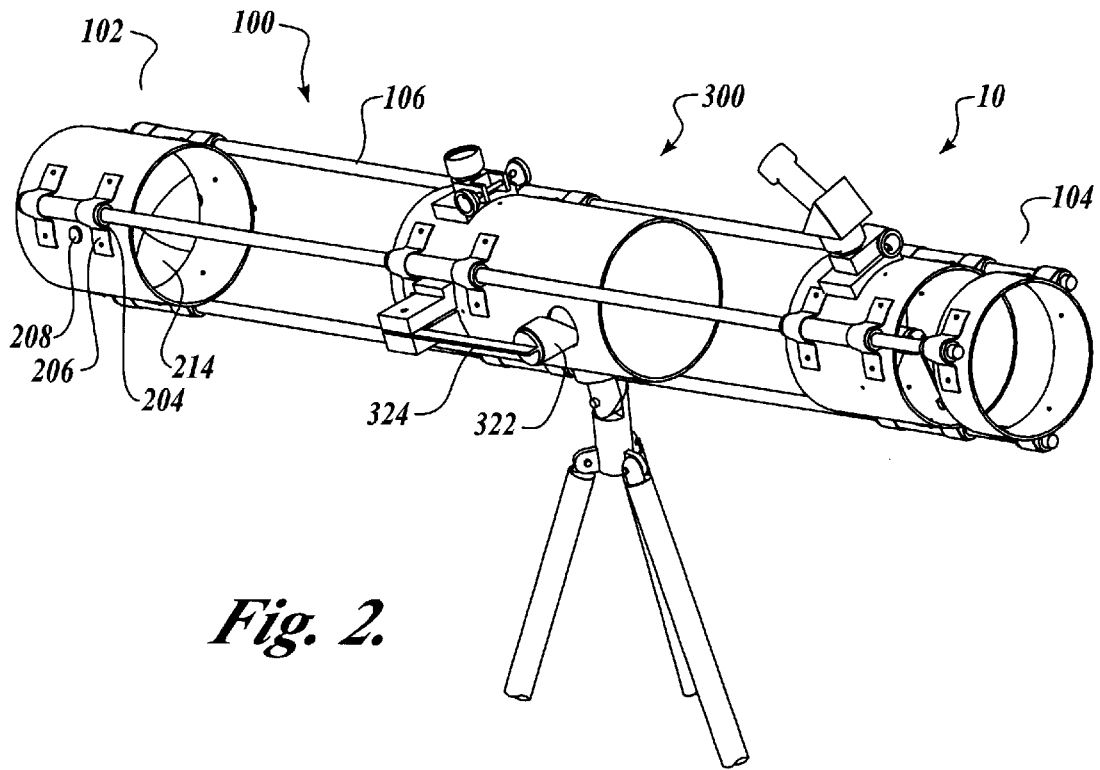
FIG. 2 is a perspective view of a version of the reflector telescope of the invention, having first and second adjustable secondary mirror assemblies.
Figure 11:
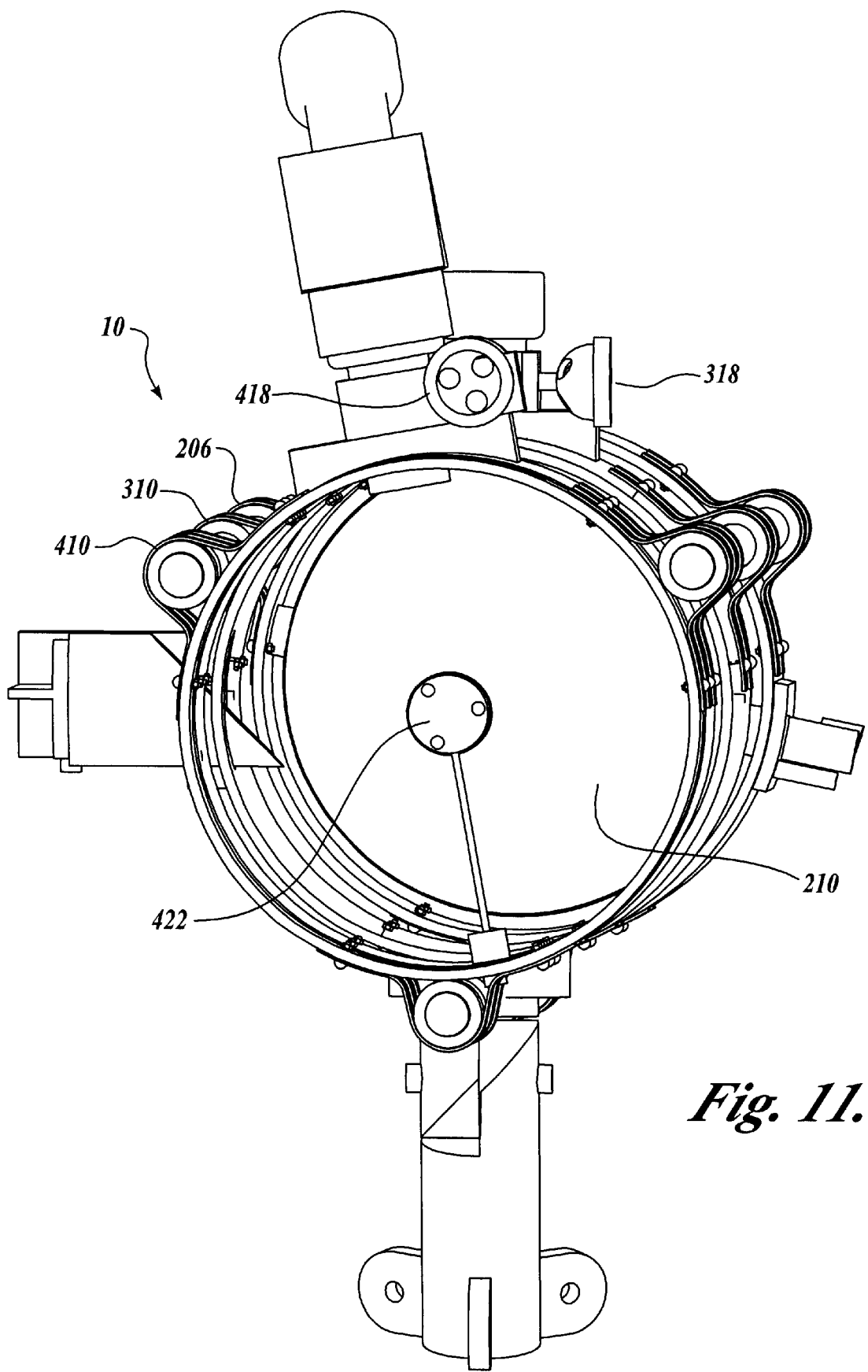

FIG. 11 is an end view of the reflective telescope of FIG. 2, illustrating the inside of the secondary mirror assembly.

DESCRIPTION

Referring generally to FIGS. 2 through 11, a reflector telescope 10 constructed in accordance with the principles of the invention is seen. A preferred telescope tube assembly 100 includes a plurality of frame tube or rod elements, between which is defined an optical path. An inner end of the telescope tube assembly supports a primary mirror assembly 200. The reflector telescope includes at least one moveable secondary mirror assembly. In a preferred version of the reflector telescope, an inner secondary mirror assembly 300 and an outer secondary mirror assembly 400 are carried by the telescope tube assembly. Each secondary mirror assembly includes a secondary mirror and focuser including an eyepiece. The secondary mirror assemblies can be slid along the frame tube elements of the telescope tube assembly, allowing the distance between the primary and secondary mirrors to be regulated. Regulating the distance between the primary and secondary mirrors allows the use of any given focuser and eyepiece assembly to be used in conjuction with the secondary mirror assembly; allows the focuser tube associated with each secondary mirror assembly to be kept substantially out of the telescope tube assembly, while still allowing the eyepiece associated with the secondary mirror assembly to be focused; results in sharp focus over a substantially greater range of distance than conventional reflector telescopes, and in particular allows focus on relatively close objects; and allows rapid adjustment of the distance of the secondary mirror from the primary mirror where the primary mirror has two or more reflective surfaces, having different focal lengths, which may be rapidly switched into the optical pathway.

As seen in FIGS. 2 through 5, a telescope tube assembly 100 supports the primary mirror assembly 200, the inner secondary mirror assembly 300 and the outer secondary mirror assembly 400. An inner end 102 of the telescope tube assembly is adjacent to the primary mirror assembly, and tends to be pointed to the ground when the telescope is used to view the sky. An outer end 104 of the telescope tube assembly is opposite the inner end, and is open to allow the entrance of light.

The telescope tube assembly may be made in any known conventional manner, such as with nested solid telescoping cylindrical metal tubes. A preferred version of the telescope tube assembly 100, as seen in the figures, is constructed of a plurality of frame tube or rod elements 106. The frame tube elements are arrayed in a parallel configuration, defining a cylindrical passage 108 between them. The passage defines the space within which: (1) incoming light 114 travels in an optical path from the outer end 104 to the primary mirror carried by the inner end 102 of the telescope tube assembly, and (2) reflected light 116 forms an optical cone within the passage, with the base of the cone adjacent to the primary mirror and the tip of the cone near the telescope's eyepiece.

Where light pollution is a problem, the frame elements may be wrapped with a shroud to prevent unwanted light from entering the telescope tube passage.

As seen in FIGS. 2 through 10, a preferred frame tube or rod element 106 is made of metal tubing or rod or similar material. In a typical application, three or four frame tube elements are used to construct the telescope tube assembly, and are spaced at equal intervals, such as 90 or 120 degrees, about the passage defined within the telescope tube assembly. More than three frame tube elements may be used where the optical components are larger and heavier.

An outer end of each frame tube element is attached to an outer end collar 110 by a fastener 112. The outer end collar keeps the outer ends of the frame tube elements 106 in a fixed relationship with each other. An inner end of each frame element is attached to an outer surface of the cylindrical tube enclosure 202 of the primary mirror assembly 200 by a fastener/s 206. In a typical application, the inner end of each frame element is encased within a bearing 204 which in turn is attached by a fastener/s 206 to the outer surface of the cylindrical tube enclosure 202 of the primary mirror assembly 200.

The construction of a preferred primary mirror assembly is performed substantially in accordance with the teachings of U.S. Pat. No. 6,061,175, issued May 09, 2000, all portions of which are hereby incorporated by reference. As such, the preferred primary mirror assembly includes a primary mirror having reflective surfaces defined on both sides, each reflective surface having a different focal length, and having means to move the primary mirror between a first position, wherein a first reflective surface is in the optical pathway and a second position, wherein a second reflective surface is in the optical pathway, substantially according to the teachings of U.S. Pat. No. 6,061,175.

The primary mirror assembly 200 is carried at an inner end of the telescope tube assembly 100. Where a conventional primary mirror assembly is used, the primary mirror would define a single reflective surface, and would be carried at the inner end of the telescope in a conventional manner.

Figure 8A:
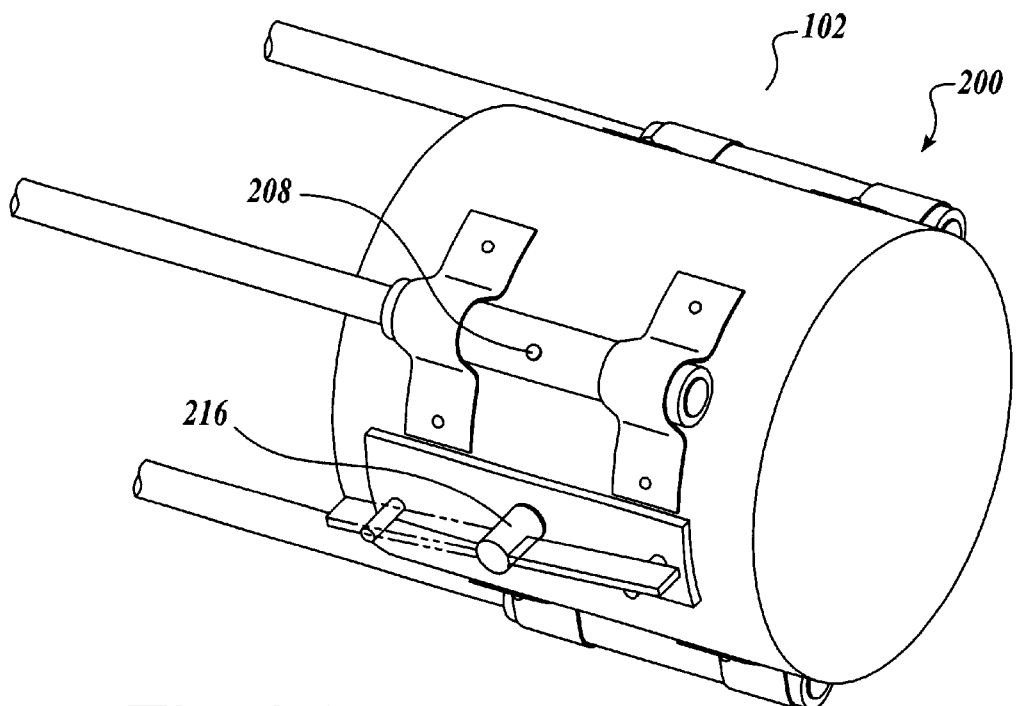
FIGS. 8A and 8B are an enlarge views of the primary mirror assembly, illustrating particularly the primary mirror mover, which rotates the primary mirror between first and second positions, wherein the user selectively places the first or second reflective surface in the optical path.
Figure 8B:
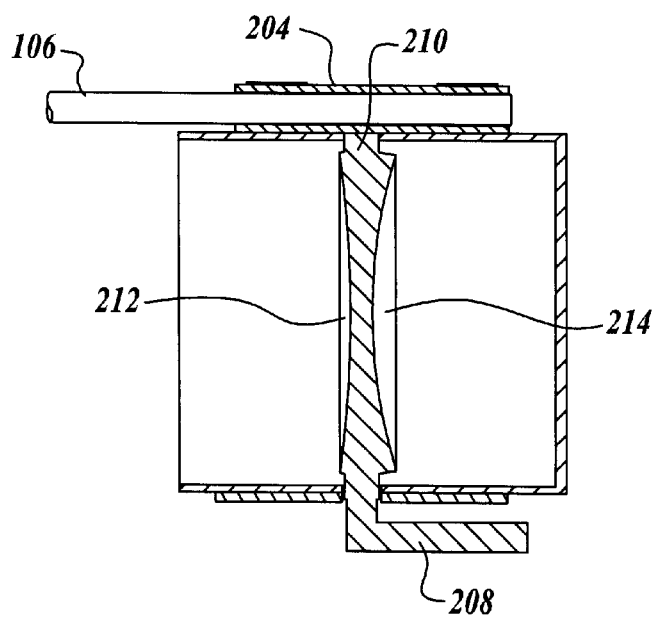

Referring particularly to FIGS. 2–5 and 8, a preferred primary mirror assembly 200 is seen. A cylindrical tube enclosure 202 is attached to the inner end of the telescope tube assembly. As seen in FIG. 8, a cylindrical bearing 204 encases the inner end of each frame tube element 106. The bearings 204 are attached to the cylindrical tube enclosure 202 by fasteners 206.

A primary mirror 210 carried within the cylindrical tube enclosure 202 defines one or more reflective surfaces. In a preferred embodiment, the primary mirror defines first and second reflective surfaces 212, 214. A primary mirror moving mechanism 216 provides for rotation of the primary mirror between a first position, wherein the first reflective surface is moved into an optical path defined within the telescope tube assembly to a second position wherein the second reflective surface is moved into the optical path defined within the telescope tube assembly.

A first, or inner, secondary mirror assembly 300, may be slid along the frame tube elements 106 of the telescope tube assembly 100. Such movement allows control over the distance between the primary and secondary mirrors. Correct selection of the distance between the primary and secondary mirrors enables the use of focusers and eyepieces that might otherwise be unusable due to the distance between the primary and secondary mirrors; enables the movement of the secondary mirror assembly to a location wherein the focuser tube is not excessively occluding the optical path of the telescope tube assembly; and allows movement of the secondary mirror to a location that enables focus on close range objects which would not otherwise be viewable.

A cylindrical tube enclosure 302 defines an inside surface 304 and an outside surface 306. A plurality of cylindrical bearings 308 are attached to the outside surface by fasteners 310. Each of the cylindrical bearings is associated with a frame tube element 106, upon which the cylindrical bearing may be slid, thereby allowing movement of the entire cylindrical tube enclosure 302 with respect to the telescope tube assembly 100 and the primary mirror assembly 200. When movement is not desired, e.g. while the telescope is being used for viewing, a lock 312 may be set to prevent movement of the cylindrical enclosure 302.

A secondary mirror 322 is carried within the cylindrical passage 108 of the telescope tube assembly 100 by a secondary mirror support 324. The secondary mirror support is carried by a surface 304 of the cylindrical tube enclosure 302. Because the secondary mirror is carried by the cylindrical tube enclosure, the cylindrical bearings 308 allow the first secondary mirror assembly to be moved along the telescope tube assembly in a manner that allows selection of the distance between the primary mirror and the first secondary mirror.

Optionally, a focuser optics 314 may be carried by the inner secondary mirror assembly 300. In a typical application, the focuser and related optics includes an eyepiece 316, a focuser mechanism 318 and a focuser tube 320.

Figure 3:
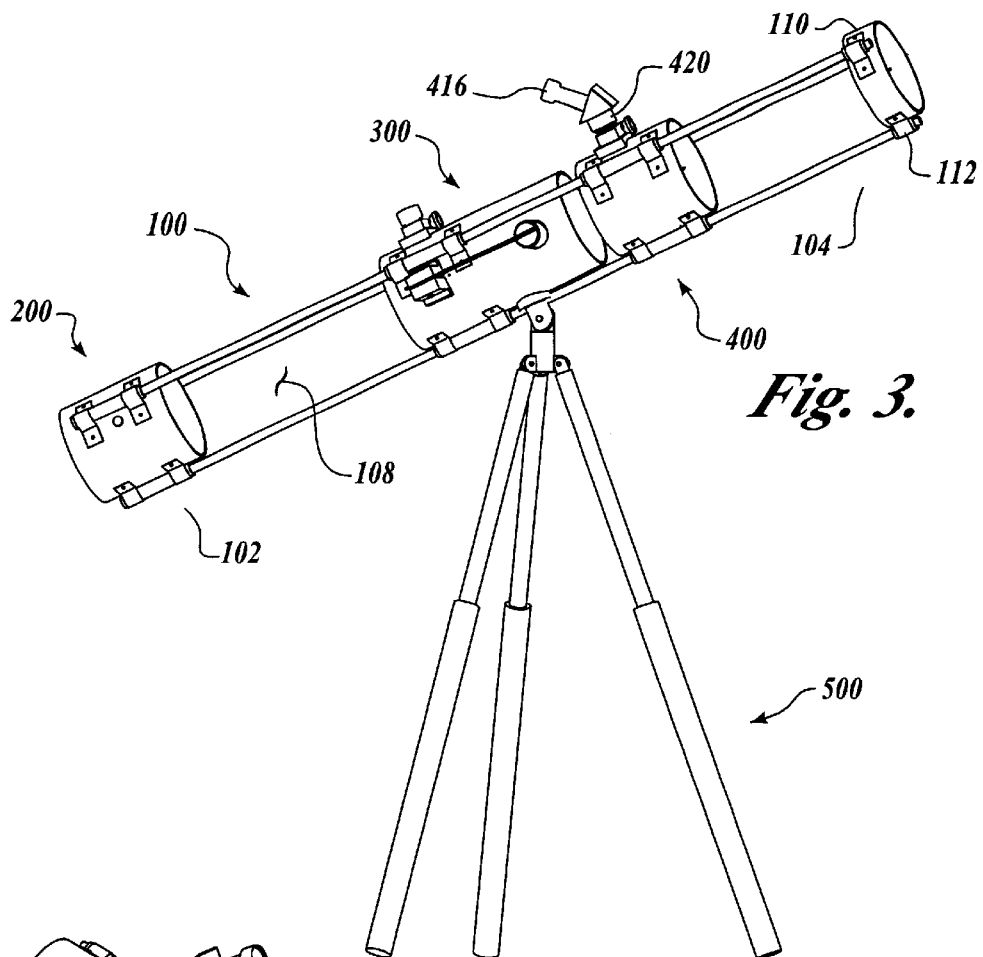
FIG. 3 is a perspective view similar to that of FIG. 2, illustrating the outer secondary mirror assembly moved toward the primary mirror and the inner secondary mirror assembly moved away from the primary mirror.
Figure 4:
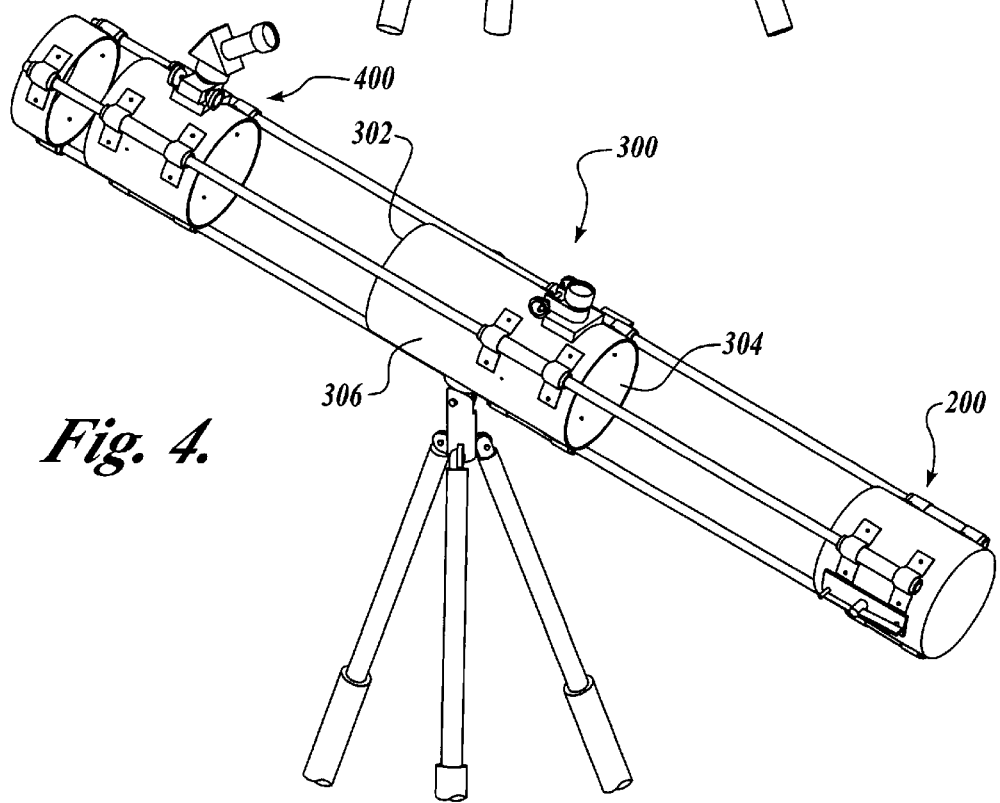
FIG. 4 is a further perspective view, illustrating further movement of both the inner and outer secondary mirror assemblies with respect to the primary mirror assembly.
Figure 5:
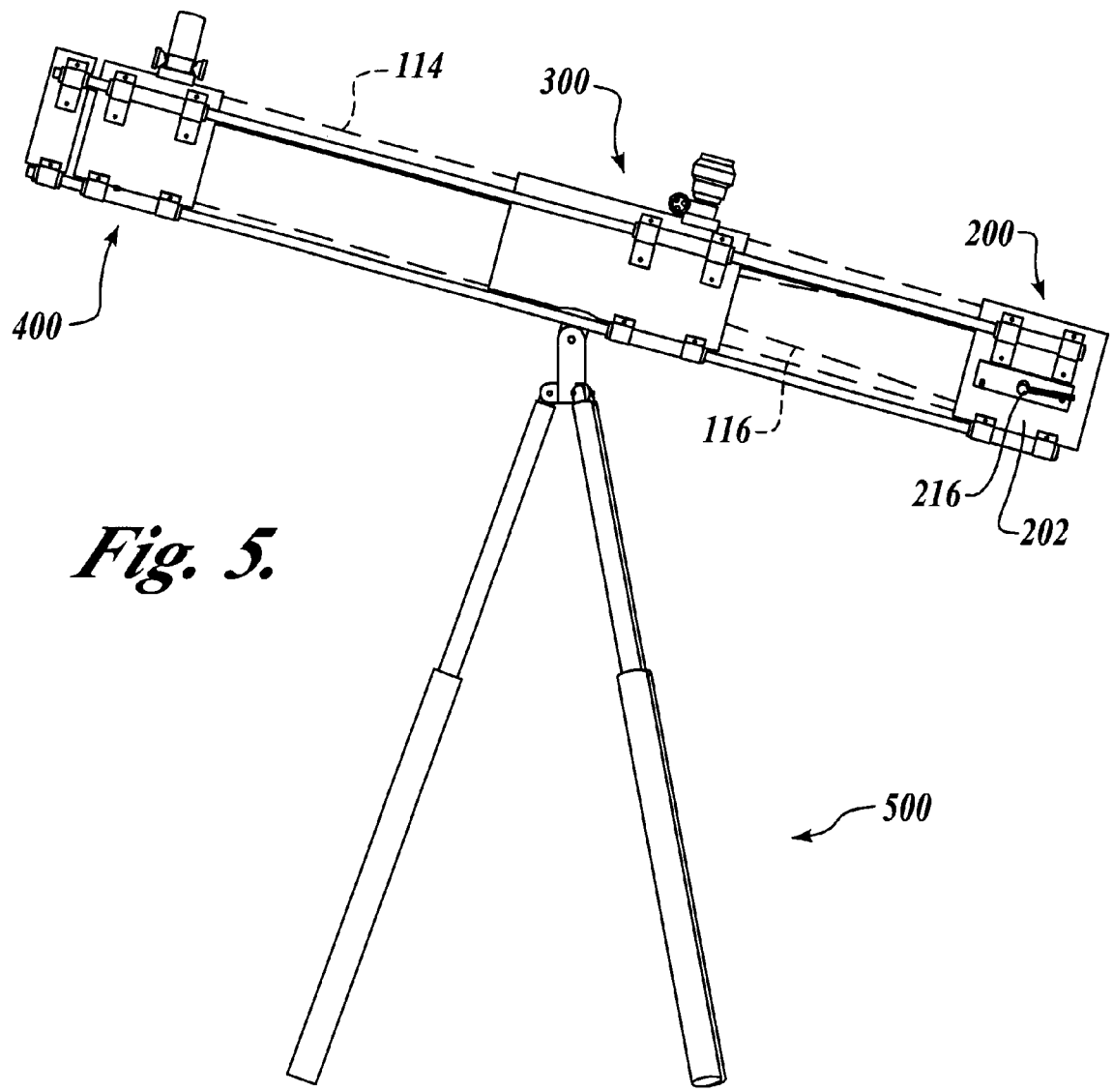
FIG. 5 is a perspective view of the telescope of FIG. 2, illustrating the outer secondary mirror moved as far as possible from the primary mirror assembly.
Figure 6:
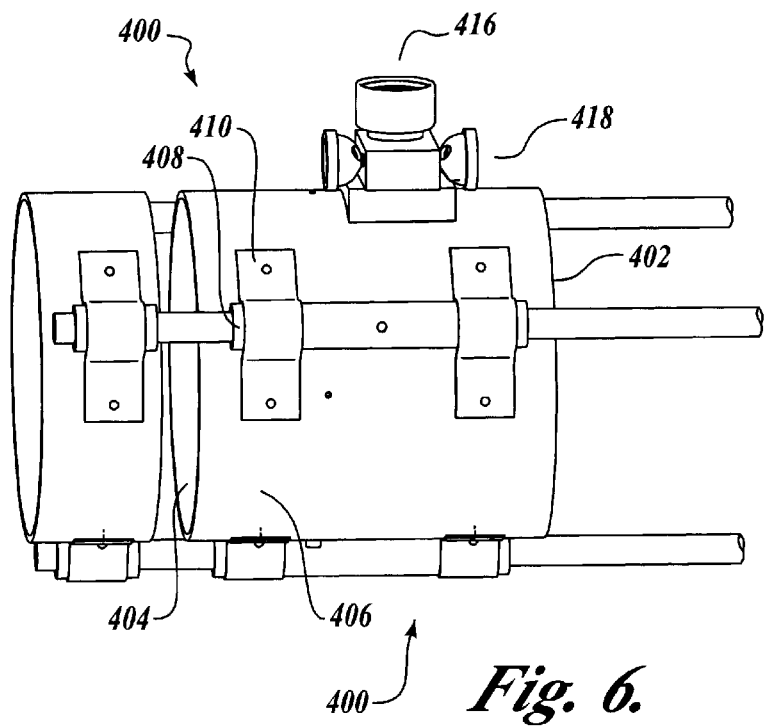
FIG. 6 is an enlarged view of the outer end collar of the telescope tube assembly and the outer secondary mirror assembly.
Figure 7:
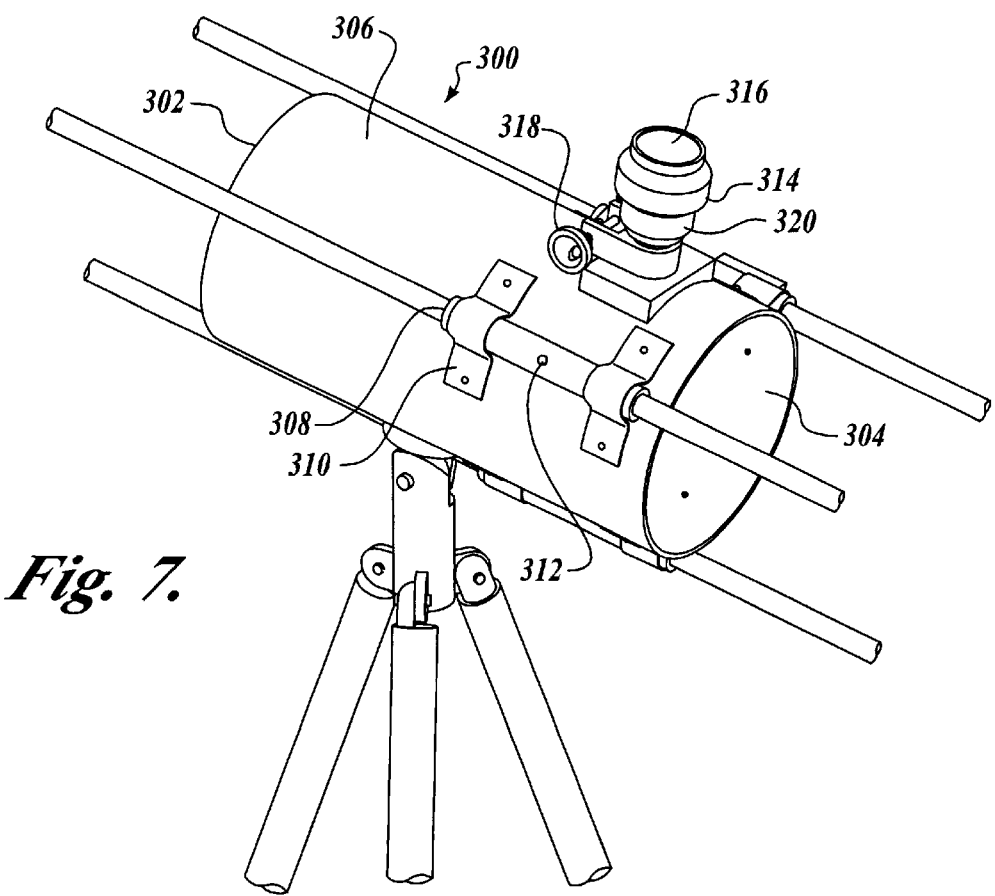
FIG. 7 is an enlarged view of the inner secondary mirror assembly.

As seen in FIGS. 3–5, a conventional equatorial telescope mount assembly 500 is typically attached to the outside surface 306 of the cylindrical enclosure 302 of the inside secondary mirror assembly 300.

Optionally, a second, or outer, secondary mirror assembly 400 includes the same elements as the first or inner secondary mirror assembly. The outer secondary mirror assembly slides on the plurality of frame tube elements of the telescope tube assembly between the first secondary mirror assembly and an outer end of the telescope tube assembly.

Inclusion of the second secondary mirror assembly is advantageous, and interacts synergistically with the preferred primary mirror assembly 200. The preferred primary mirror assembly includes first and second reflective surfaces, each having a different focal length. The first and second secondary mirror assemblies 300, 400 are therefore advantageously positioned at distances related to the first and second focal lengths, respectively.

To use the reflector telescope with first and second adjustable secondary mirror assemblies 300, 400, the user typically begins by positioning the first and second secondary mirror assemblies at distances from the primary mirror related to the focal length of the first and second reflective surfaces of the primary mirror.

Where newly purchased focuser optics 314 are to be installed on the cylindrical tube enclosure 302, it is frequently the case that the enclosure 302 must be moved slightly, either toward the inner end 102 or outer end 104 of the telescope tube assembly. Such an adjustment will optimize the range of focus of the new focuser related optics.

The user may then adjust the primary mirror mover 216 to expose the desired reflective surface. The telescope is then aimed at an object to be viewed, and the focuser optics of the appropriate secondary mirror 300 or 400 is adjusted.

Where the adjustment of the focuser is somewhat extreme, i.e. the focuser tube 320 extends too deeply into the optical path 114, the entire secondary mirror assembly may be moved slightly, and the focuser optics focused again. This will result in less occlusion of the focuser tube within the optical path.

Where the object to be viewed is too close for focus, the entire secondary mirror assembly may be moved somewhat, toward the outer end 104 of the telescope. The object to be viewed will then be within the range of focus.

The previously described versions of the present invention have many advantages, including a primary advantage of providing a novel reflector telescope having adjustment means for varying the distance between the secondary mirror and the primary mirror, thereby allowing the use of a variety different pieces of optical equipment associated with the secondary mirror, by adjusting the distance between the primary and secondary mirror to suit the piece of optical equipment selected.

Another advantage of the present invention is to provide a novel reflector telescope having adjustment means for varying the distance between the secondary mirror and the primary mirror, thereby allowing the secondary mirror and associated optical equipment (e.g. the eyepiece) to be adjusted to a location (typically closer to the outer end of the telescope frame assembly) that is not the standard location for astronomical use with the optical equipment, but which allows sharp focus on objects much closer to the telescope that would otherwise be possible.

Another advantage of the present invention is to provide a novel reflector telescope having adjustment means for varying the distance between the secondary mirror and the primary mirror in a manner which cooperates synergistically with a primary mirror having more than one reflective surface, particularly where each reflective surface has a different focal length.

A still further advantage of the present invention is to provide a novel reflector telescope having adjustment means for varying the distance between the secondary mirror and the primary mirror, thereby allowing the secondary mirror and associated optical equipment to be moved to a precise distance from the primary mirror which results in both the sharp focus on the object to be viewed and also results in reduction of the degree of occlusion of the optical path by the focuser tube.

Although the present invention has been described in considerable detail and with reference to certain preferred versions, other versions are possible. For example, while in a preferred embodiment of the present invention, inner and outer secondary mirror assemblies are disclosed, it is clear that a single secondary mirror assembly would provide many of the advantages of the preferred version of the invention, and a plurality of secondary mirror assemblies would provide additional advantages. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A reflector telescope, comprising:
    (A) a telescope tube assembly defining an interior passage;
    (B) a primary mirror assembly, carried at an inner end of the telescope tube assembly, comprising:
        (a) a primary mirror carried within a tube enclosure defining first and second reflective surfaces; and
        (b) primary mirror moving means for moving the primary mirror between a first position wherein the first reflective surface is moved into an optical path defined within the telescope tube assembly to a second position wherein the second reflective surface is moved into the optical path defined within the telescope tube assembly; and
    (C) a first secondary mirror assembly, carried by the telescope tube assembly, comprising:
        (a) a secondary mirror, carried within the interior passage; and
        (b) bearing means, between the secondary mirror and the telescope tube assembly, for moving the secondary mirror assembly with respect to the primary mirror.

2. The reflective telescope of claim 1, additionally comprising a second secondary mirror assembly, carried by the telescope tube assembly whereby a second secondary mirror is disposed within the interior passage.

3. A reflective telescope, comprising:
    (A) a telescope tube assembly, comprising:
        (a) a plurality of frame tube elements defining a cylindrical passage between them; and
        (b) an outer end collar, carried by an outer end of the frame tube elements;
    (B) a primary mirror assembly, carried at an inner end of the telescope tube assembly, comprising:
        (a) a primary mirror carried within a cylindrical tube enclosure defining first and second reflective surfaces; and
        (b) primary mirror moving means for moving the primary mirror between a first position wherein the first reflective surface is moved into an optical path defined within the telescope tube assembly to a second position wherein the second reflective surface is moved into the optical path defined within the telescope tube assembly;
    (C) a first secondary mirror assembly, comprising:
        (a) a cylindrical tube enclosure having an outside surface;
        (b) a plurality of cylindrical bearings, each cylindrical bearing sliding on an associated frame tube element of the telescope tube assembly;
        (c) a secondary mirror support, carried within the cylindrical passage of the telescope tube assembly and attached to an inside surface of the cylindrical tube enclosure; and
        (d) a secondary mirror, carried by the secondary mirror support.

4. The reflective telescope of claim 3, additionally comprising a second secondary mirror assembly, carried by the telescope tube assembly between the first secondary mirror assembly and the outer end collar.

5. The reflective telescope of claim 4, wherein the second secondary mirror assembly comprises:
    (A) a cylindrical tube enclosure having an outside surface;
    (B) a plurality of cylindrical bearings, each cylindrical bearing sliding on an associated frame tube element of the telescope tube assembly;

(C) a secondary mirror support, carried within the cylindrical passage of the telescope tube assembly and attached to an inside surface of the cylindrical tube enclosure; and (D) a secondary mirror, carried by the secondary mirror support.

6. A multiple focal length reflecting telescope, comprising:

(A) a telescope tube assembly;

(B) a primary mirror, carried within the telescope tube assembly, having a first reflective surface resulting in a first focal length and a second reflective surface resulting in a second focal length;

(C) primary mirror moving means for moving the primary mirror from a first position wherein the first reflective surface is moved into an optical path defined within the telescope to a second position wherein the second reflective surface is moved into the optical path defined within the telescope; and (D) a first secondary mirror assembly, carried by the telescope tube assembly, comprising:

(a) an enclosure;

(b) bearing means, attached to the enclosure and slidable on the telescope tube assembly;

(c) a secondary mirror support, carried within the interior passage of the telescope tube assembly and attached to an inside surface of the enclosure; and (d) a secondary mirror, carried by the secondary mirror support.

* * * * *